Patented June 13, 1933

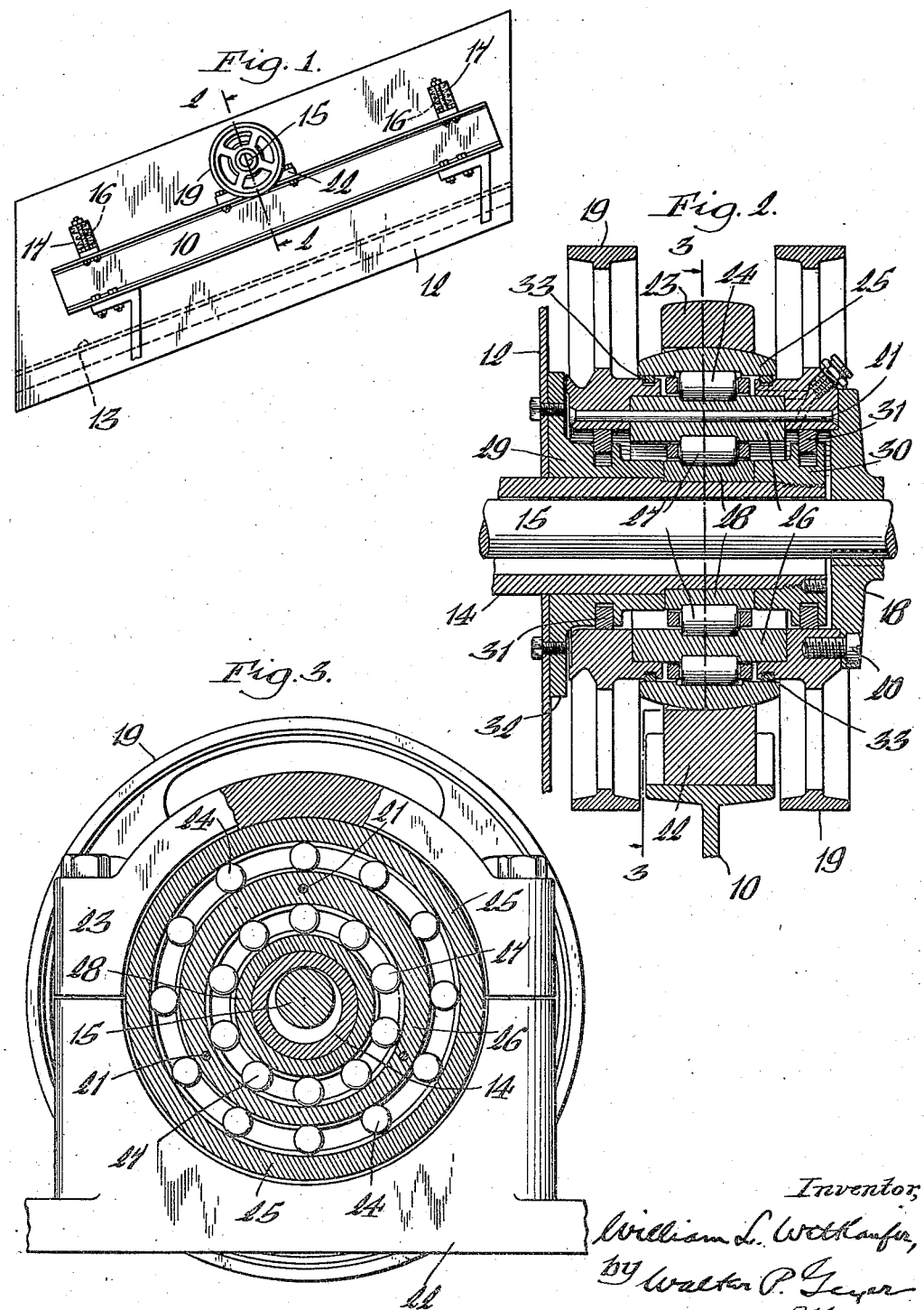

1,914,226

UNITED STATES PATENT OFFICE

WILLIAM L. WETTLAUFER, OF BUFFALO, NEW YORK

SHAKING SCREEN

Application filed May 31, 1930. Serial No. 458,057.

This invention relates more particularly to improvements in the bearing or mounting of shaking screens employed for grinding and sizing materials of various kinds.

One of its objects is the provision of a bearing of this character which is simple and compact in construction, which is of minimum weight commensurate with the load imposed thereon, and which is durable and efficient.

Another object of the invention is to provide a self-alining bearing for vibratory or shaking screens which is designed to carry the load radially of the gyrating element, and which is disposed exteriorly of the screen-body where grit and other foreign material is not liable to gain access to the bearing.

Other features of the invention reside in the construction and arrangement of its parts hereinafter described and particularly pointed out in the appended claims.

In the accompanying drawing:—

Figure 1 is a side elevation of a shaking screen showing my improved bearing applied thereto. Figure 2 is an enlarged fragmentary cross section thereof taken on line 2—2, Figure 1. Figure 3 is a sectional elevation of the bearing taken approximately in the plane of line 3—3, Figure 2.

Similar characters of reference indicate corresponding parts throughout the several views.

While the vibratory screen may be of any appropriate construction, that shown in the drawing by way of example, comprises a supporting frame consisting of longitudinal beams 10 between which is supported or suspended a vibrating screen-body or carrier 12 having one or more screening surfaces 13 disposed substantially horizontally between its side walls. Extending transversely through this screen-body at a point intermediate its front and rear ends is a tube or hollow shaft 14 which constitutes the means for sustaining said body from the frame-beams and to which a positive gyratory motion is transmitted for vibrating the body in a substantially circular path. This hollow shaft is eccentrically disposed about a driving shaft 15 which may be driven by an electric motor or other suitable source of power, not shown. At its ends or four corners the screen-body may be yieldingly suspended from the frame-beams 10 or supported thereon by springs 16 concealed within housings 17.

Keyed to the drive shaft 15 at its opposite ends is a hub member 18 having one or more counterweighted fly wheels 19 connected thereto to turn with the shaft. I prefer to provide two fly wheels at each end of the shaft adjoining the side walls of the screen-body, the wheels of a set being disposed in spaced relation with one on either side of the respective beam 10, as seen in Figure 2, so as to balance and equalize the forces imposed on the supporting beams. The outer fly wheel of a set is fastened to the hub member by bolts 20 or like means and the companion inner fly wheel is joined at its hub by a plurality of tie pins or bolts 21 with such outer wheel, whereby both wheels revolve as a unit with the drive shaft. Mounted on each frame-beam is a bearing-block consisting of a lower section 22 and an upper section 23 which is constructed to provide a main or radial bearing for the screen-body and an eccentric bearing for the hollow shaft 14, both bearings being in the same vertical plane and substantially in line with the center line of the frame-beam.

The main or load-sustaining bearing of the vibrating screen consists of an outer, annular row of ball or roller bearings 24 disposed concentrically about the axis of the drive shaft 15, the outer race thereof being formed in the inner side of a self-alining ring or collar 25 seated in the bearing-sections 22, 23 and the inner race of the same being formed in the periphery of an eccentric bearing sleeve 26 surrounding the hollow shaft in concentric, spaced relation thereto and connected with the fly wheels 19 by the tie pins 21 so as to turn therewith. The periphery of this bearing sleeve is concentric with the axis of the drive shaft but eccentric to the axis of the hollow shaft 14. The eccentric bearing for the latter consists of an inner, annular row of ball or roller bearings 27 disposed eccentrically about the axis of the drive shaft, the outer race thereof being formed in the bore of the sleeve 26, which bore is concentric with the axis of the hollow shaft, while the inner race of the same is formed in a ring 28 applied to said hollow shaft. By this construction and arrangement of parts a very compact, duplex bearing is provided whose load-sustaining and eccentric bearing elements are disposed in the same vertical plane and in line with the frame-beams 10, the rotation of the drive shaft 15 turning the eccentric bearing sleeve 26 which transmits a gyratory motion to the hollow shaft 14 to positively vibrate the screen in a substantially circular, uniform motion. Furthermore, all parts of the bearing are located exteriorly of the screen-body where they are free from contact with grit and other foreign matter, thereby affording maximum protection to the bearings.

At either side of the race-ring 28 and in the space between the hollow shaft and the fly wheels 19 and adjoining portions of the eccentric sleeve 26 are collars 29, 30 to which packing rings 31 are applied for engagement with the bores of said fly wheels for retaining the grease within the bearing. The collar 29 has an annular flange 32 for bolting it to the corresponding side wall of the screen-body, while the collar 30 is threaded onto the outer end of the hollow shaft; these collars abutting at their opposing ends against the ring 28. Similar packing rings 33 are disposed between the exterior faces of the fly wheel-hubs and the inner face of the self-alining ring 25.

I claim as my invention:—

1. A device of the character described, comprising a supporting frame having bearing-blocks thereon each provided with self-contained inner and outer bearings eccentrically disposed in substantially the same vertical plane, a hollow shaft journaled at its ends in the inner bearings of said bearing-blocks, and a drive shaft extending freely through said hollow shaft in concentric relation to the outer bearings of the bearing-blocks, and including eccentric means rotatable with the drive shaft and disposed between said inner and outer bearings for imparting a positive gyratory movement to the hollow shaft.

2. A device of the character described, comprising a supporting frame having bearing-blocks thereon, each of said blocks including inner and outer annular bearings disposed in substantially the same vertical plane, a hollow shaft journaled at its ends in the inner bearings of said blocks, and a drive shaft extending freely through said hollow shaft in eccentric relation thereto and including a part revolvable therewith and journaled in said outer annular bearings.

3. A device of the character described, comprising spaced frame members, bearing-blocks secured thereto and each including inner and outer eccentrically arranged annular bearings disposed substantially in line with the vertical center line of said frame members, a hollow shaft journaled at its ends in the inner bearings of said blocks, a drive shaft extending freely through the hollow shaft, and an eccentric sleeve disposed between said inner and outer bearings and connected to the drive shaft to turn therewith, whereby the hollow shaft is gyrated about said drive shaft.

4. A device of the character described, comprising a gyrating carrier element, a drive shaft disposed eccentrically of said carrier, and bearings for said carrier and said drive shaft disposed one within the other and in the same plane of rotation, the inner bearing being arranged concentrically with its gyrating carrier and the outer bearing being concentric with its drive shaft.

5. A device of the character described, comprising a gyrating hollow shaft, a drive shaft extending freely through said hollow shaft and in eccentric relation therewith, eccentric sleeves surrounding the ends of said hollow shaft and connected to the drive shaft to turn therewith, fly wheels surrounding said drive shaft and connected thereto and to said sleeves to turn therewith, and two sets of annular roller bearings disposed about the hollow shaft in the same plane of rotation and engaging the inner and outer faces of said sleeves, respectively, the inner bearing being concentric with the hollow shaft and the outer bearing being concentric with the drive shaft.

6. A device of the character described, comprising a gyrating hollow shaft, a drive shaft extending freely through said hollow shaft and in eccentric relation therewith, fly wheels mounted on said drive shaft to turn therewith and having their hub-bores surrounding the hollow shaft in spaced relation thereto, eccentric sleeves connected to the fly wheel hubs, and inner and outer roller bearings disposed about the hollow shaft in the same plane of rotation and engaging the opposite faces of said sleeves, respectively, the inner bearings being concentric with the hollow shaft and the outer bearings being concentric with the drive shaft, whereby the hollow shaft is gyrated about said drive shaft.

7. In a device of the character described, frame members, bearing blocks secured to said frame members and having self-alining rings seated therein, a hollow shaft journaled at its ends in said bearing-blocks, a drive shaft extending freely through said hollow shaft and in eccentric relation thereto, counterweighted fly wheels mounted in said shaft to turn therewith, eccentric sleeves connected to said fly wheels and surrounding said hollow shaft in spaced relation thereto and to said self-alining rings, and inner and outer roller bearings disposed in the same plane of rotation and engaging the opposite faces of said sleeves and the outer and inner faces of said hollow shaft and said rings, respectively, the inner bearings being concentric with the hollow shaft and the outer bearings being concentric with the drive shaft, whereby a gyratory motion is transmitted to the hollow shaft about said drive shaft.

8. A bearing of the character described, comprising a bearing block containing an outer annular row of anti-friction bearings disposed concentrically about the axis of the bearing block, an inner innular row of anti-friction bearings disposed eccentrically of said outer row of bearings, and a bearing sleeve disposed between said outer and inner rows of bearings, the periphery of said sleeve being concentric with the outer row of bearings and the bore of said sleeve being concentric with the inner row of bearings.

WILLIAM L. WETTLAUFER.